United States Patent
Zhou

(10) Patent No.: US 8,497,878 B2
(45) Date of Patent: Jul. 30, 2013

(54) METHOD AND APPARATUS FOR DETERMINING IMAGE ORIENTATION

(75) Inventor: Jianping Zhou, Fremont, CA (US)

(73) Assignee: Texas Instruments Incorporated, Dallas, TX (US)

( * ) Notice: Subject to any disclaimer, the term of this patent is extended or adjusted under 35 U.S.C. 154(b) by 940 days.

(21) Appl. No.: 12/610,801

(22) Filed: Nov. 2, 2009

(65) Prior Publication Data

US 2010/0110107 A1    May 6, 2010

Related U.S. Application Data

(60) Provisional application No. 61/111,081, filed on Nov. 4, 2008.

(51) Int. Cl.
*G09G 5/00* (2006.01)

(52) U.S. Cl.
USPC .......................................... 345/656; 345/659

(58) Field of Classification Search
USPC .................................. 345/656, 659
See application file for complete search history.

(56) References Cited

PUBLICATIONS

Jiebo Luo, Matthew Boutell, "Automatic Image Orientation Detection via Confidence-Based Integration of Low-Level and Semantic Cues," IEEE Transactions on Pattern Analysis and Machine Intelligence, vol. 27, No. 5, pp. 715-726, May 2005.
Vailaya, A.; Zhang, H.; Changjiang Yang; Feng-I Liu; Jain, A.K.; "Automatic Image Detection Orientation," Image Processing, IEEE Transactions on vol. 11, Issue 7, Jul. 2002 pp. 746-755.

*Primary Examiner* — Maurice L McDowell, Jr.
(74) *Attorney, Agent, or Firm* — Mima Abyad; W. James Brady; Frederick J. Telecky, Jr.

(57) ABSTRACT

A method and apparatus for automatically deciding on the orientation of image. The method includes computing average and standard deviation of luminance of the top region of a portion of the image, of the bottom region of a portion of the image, of the left region of a portion of the image, and of the right region of a portion of the image, computing average luminance of the image, computing, in the digital signal processor, consolidated luminance difference and uniformity of top and bottom regions, and left and right regions, utilizing the computed average and standard deviation of at least one of the bottom region, the left region or the right region and utilizing portrait orientation if $difLR-difTB > t1$ && $stdTB-stdLR > t2$ or if $difLR-difTB > t3$ && $stdTB-stdLR > t4$, otherwise, utilizing landscape orientation.

3 Claims, 2 Drawing Sheets

METHOD AND APPARATUS FOR DETERMINING IMAGE ORIENTATION

CROSS-REFERENCE TO RELATED APPLICATIONS

This application claims benefit of U.S. provisional patent application Ser. No. 61/111,081, filed Nov. 4, 2008, which is herein incorporated by reference.

BACKGROUND OF THE INVENTION

1. Field of the Invention

Embodiments of the present invention generally relate to a method and apparatus for orientation detection of an image.

2. Description of the Related Art

Digital cameras are widely used by consumers. At normal shooting position, a consumer obtains a landscape image. However, the consumer sometimes obtains a portrait image by rotating the camera. We show an example of different image orientation in FIG. 1. The top two images have 0 degree and 180 degree orientation, also known as landscape orientation. The bottom two images have 90 degree and 270 degree orientation, also known as portrait orientation.

Images with wrong orientation (90, 180, 270 degree) should be corrected for camera users. Otherwise, camera users need to correct them manually. Also, many image processing and computer vision algorithms (e.g. content-based image retrieval, face or object detection) assume that the top of the image corresponds to the top of the scene, which is not true for images with wrong orientation. If the camera does not correct 180, 90, or 270 degree orientation, these algorithms cannot work properly. After image orientation has been detected, a computer can easily correct orientation by rotating the image.

High-end digital cameras are equipped with motion sensors that detect camera rotation. However, low-end digital cameras or camera phones cannot afford them. For those cameras, camera users perform image orientation detection and correction manually. It is challenging to detect image orientation automatically. Some image orientation algorithms have been proposed for image processing applications on desktop PC. However, they are too complex to be implemented on the digital cameras. Also, a desirable method for digital cameras should be universal, since digital cameras will be used to capture different kinds of images. It also should have low computation complexity and low memory, due to the cost and shot-to-shot constraints of digital cameras.

Therefore, there is a need for an improved method and/or apparatus for determining image orientation.

SUMMARY

Embodiments of the current invention relate to a method and apparatus for automatically deciding on the orientation of image. The method includes computing average and standard deviation of luminance of the bottom region of a portion of the image, of left region of a portion of the image, and of the right region of a portion of the image, computing average luminance of the image, computing, in the digital signal processor, consolidated luminance difference and uniformity of top and bottom regions, and left and right regions, utilizing the computed average and standard deviation of at least one of the bottom region, the left region or the right region and utilizing portrait orientation if difLR−difTB>t1 && stdTB−stdLR>t2 or if difLR−difTB>t3 && stdTB−stdLR>t4, otherwise, utilizing landscape orientation.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

One distinguishes between portrait orientation (90 and 270 degrees) from landscape orientation (0 and 180 degree). Luminance values are used in image processing in many literatures. The luminance level of each pixel is computed as $Y=0.2125R+0.7154G+0.0721B.$ One observation is that the top or bottom of scene usually has large luminance deviation from the average luminance of the image. Another observation is that the top or bottom of scene usually has uniform luminance distribution. For example, images may have sky, cloud, grass, snow, road, or dark background in the top or bottom part.

Figure 1:
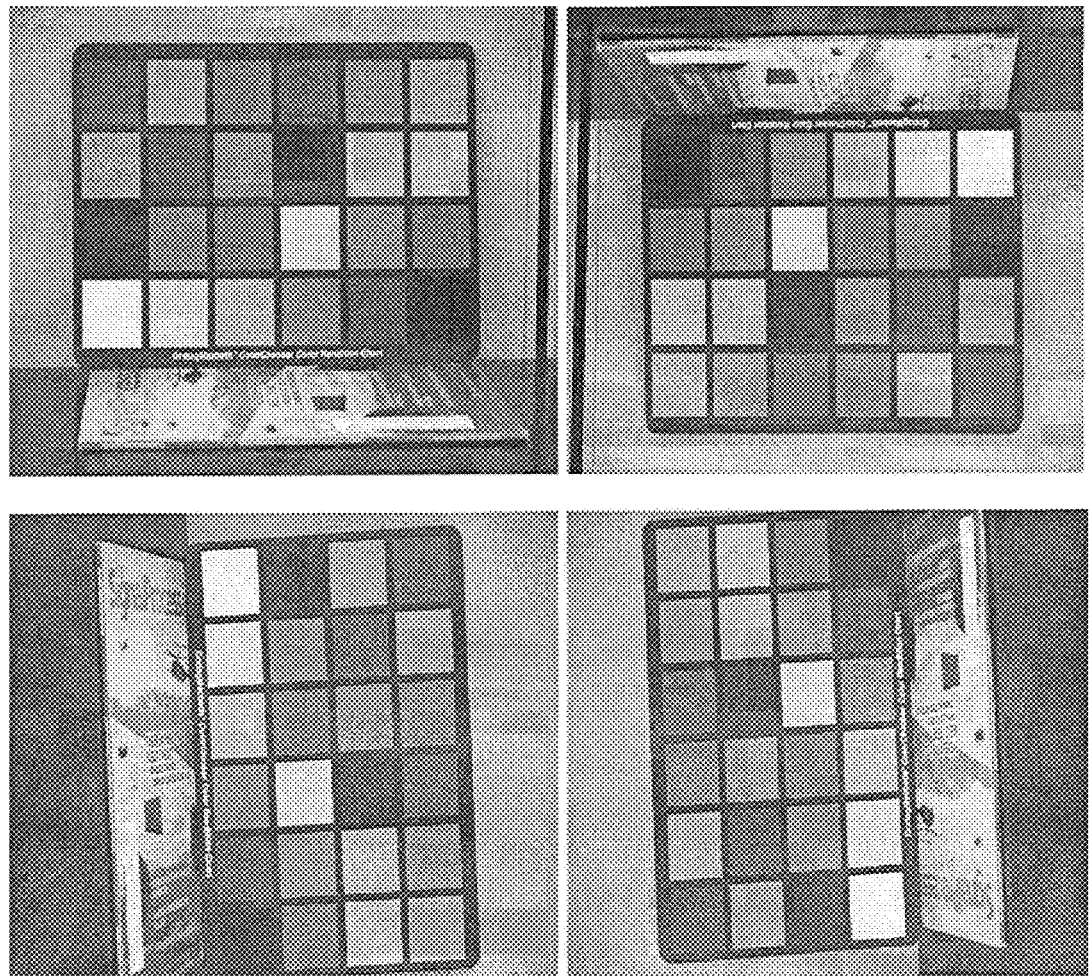
FIG. 1 is an embodiment depicting an image captured in different orientations.
Figure 2:
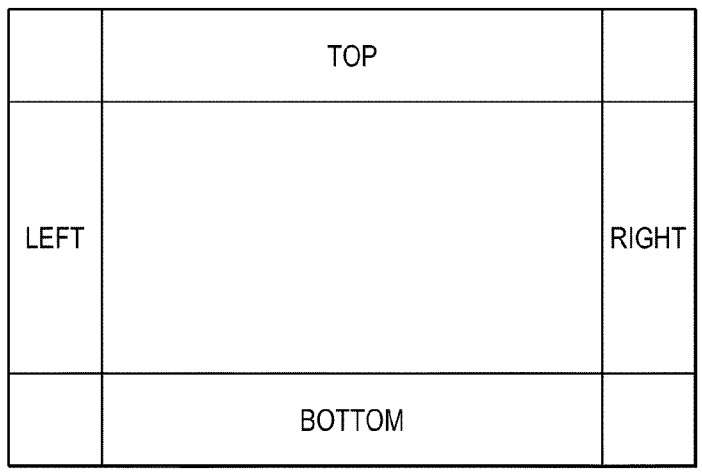
FIG. 2 is an embodiment depicting various regions of an image.

Using local luminance mean and variance, one detects the image orientation. Specifically, one computes the average and standard deviation of luminance of the top region. FIG. 2 is an embodiment depicting various regions of an image. The height of the region may be 10% of the image height and the width is equal to the image width.

Figure 3:
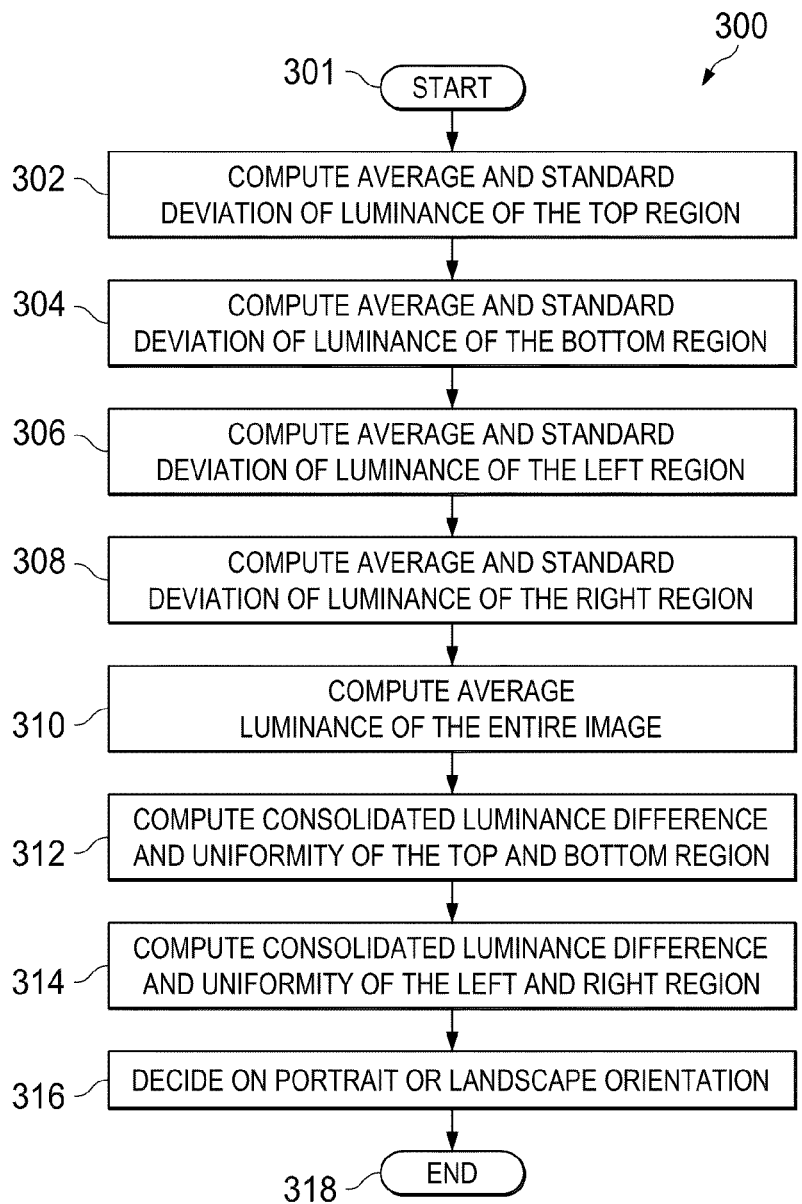
FIG. 3 is a flow diagram depicting an embodiment of a method for automatically determining image orientation.

FIG. 3 is a flow diagram depicting an embodiment of a method for automatically determining image orientation. The method 300 starts at step 301 and proceeds to step 304. At step 302, the method 300 computes the average and standard deviation of luminance of the top region, as shown in FIG. 2, which are herein denote by aveT, and stdT. The height of the region may be 10% of the image height and the width is equal to the image width. At step 304, the method 300 computes the average and standard deviation of luminance of the bottom region, as shown in FIG. 2, which are herein denote by aveB, and stdB. The height of the region may be 10% of the image height and the width is equal to the image width. At step 306, the method 300 computes the average and standard deviation of luminance of the left region, as shown in FIG. 2, which are denoted by aveL, and stdL. The height of the region is equal to the image height and the width may be 10% of the image width.

At step 308, the method 300 computes the average and standard deviation of luminance of the right region, as shown in FIG. 2. The height of the region is equal to the image height and the width may be 10% of the image width, which are denoted them by aveR, and stdR. At step 310, the method 300 computes the average luminance of the whole image, denoted by aveImg. At step 312, the method 300 computes the consolidated luminance difference and uniformity of top and bottom regions $difTB=\max(|aveT-aveImg|,|aveB-aveImg|);$ $stdTB=\min(stdT,stdB).$ At step 314, the method 300 computes the consolidated luminance difference and uniformity of left and right regions $$difLR = \max(|aveL - aveImg|, |aveR - aveImg|);$$

$$stdLR = \min(stdL, stdR).$$

At step 316, the method 300 decides on the following way:

If $difLR - difTB > t1$ && $stdTB - stdLR > t2$, portrait orientation;

If $difLR - difTB > t3$ && $stdTB - stdLR > t4$, portrait orientation;

Otherwise, landscape orientation.

In this embodiment, t1, t2, t3, and t4 are four parameters. They are set to 2.5, 3.5, 11.5, and −28. The method 300 ends at step 318.

After distinguishing the portrait orientation from landscape orientation, further, classification may be performed. Images captured by digital cameras rarely have 180 degree orientation. However, if an image is detected as landscape orientation, it is detected as 0 degree orientation. Images captured by a given digital camera usually have either 90 degree or 270 degree orientation, but not both. In this embodiment, one orientation may be specified, after an image has been detected as portrait orientation. Further classification may be performed as follows:

If $aveR - aveL > t5$ && $devL - devR > t6$ && $aveR < t7$

Here t5, t6, and t7 are three parameters. In current implementation, they are set to 76, −10, and 150.

Currently, some orientation detection algorithms are proposed for digital images, for example. However, these algorithms apply complex feature extraction or object detection on the images, resulting in high computational complexity and high memory requirement. One embodiment utilizes luminance mean and variance to simplify orientation detection.

The main advantages of our approach are as follows: (a) Our approach has very low computation complexity; (b) Our approach has very low memory requirement; and (c) Our approach can be easily implemented on existing hardware image processors. The main computation is computing average and standard deviation of luminance in four regions, which can be performed by H3A of TI image processors.

While the foregoing is directed to embodiments of the present invention, other and further embodiments of the invention may be devised without departing from the basic scope thereof, and the scope thereof is determined by the claims that follow.

What is claimed is:

1. A method of a digital signal processor for automatically deciding on the orientation of image, the method comprising:
   computing average and standard deviation of luminance of the top region of a portion of the image, of the bottom region of a portion of the image, of the left region of a portion of the image, and of the right region of a portion of the image;
   computing average luminance of the image;
   computing, in the digital signal processor, consolidated luminance difference and uniformity of top and bottom regions, and left and right regions, utilizing the computed average and standard deviation of at least one of the bottom region, the left region or the right region, wherein the consolidated luminance difference of top and bottom regions is $$difTB = \max(|aveT - aveImg|, |aveB - aveImg|);$$

consolidated luminance uniformity of top and bottom regions is $$stdTB = \min(stdT, stdB),$$

consolidated luminance difference and uniformity of left and right regions is $$difLR = \max(|aveL - aveImg|, |aveR - aveImg|),$$

consolidated luminance difference and uniformity of left and right regions is $$stdLR = \min(stdL, stdR); \text{ and}$$

utilizing portrait orientation if $difLR - difTB > t1$ && $stdTB - stdLR > t2$ or if $difLR - difTB > t3$ && $stdTB - stdLR > t4$, otherwise, utilizing landscape orientation.

2. An apparatus for automatically deciding on the orientation of image, comprising:
   means for computing average and standard deviation of the top region of a portion of the image, of luminance of the bottom region of a portion of the image, of the left region of a portion of the image, and of the right region of a portion of the image;
   means for computing average luminance of the image;
   means for computing, in the digital signal processor, consolidated luminance difference and uniformity of top and bottom regions, and left and right regions, utilizing the computed average and standard deviation of at least one of the bottom region, the left region or the right region, wherein the consolidated luminance difference of top and bottom regions is $$difTB = \max(|aveT - aveImg|, |aveB - aveImg|),$$

consolidated luminance uniformity of top and bottom regions is $$stdTB = \min(stdT, stdB),$$

consolidated luminance difference and uniformity of left and right regions is $$difLR = \max(|aveL - aveImg|, |aveR - aveImg|),$$

consolidated luminance difference and uniformity of left and right regions is $$stdLR = \min(stdL, stdR); \text{ and}$$

means for utilizing portrait orientation if $difLR - difTB > t1$ && $stdTB - stdLR > t2$ or if $difLR - difTB > t3$ && $stdTB - stdLR > t4$, otherwise, utilizing landscape orientation.

3. A non-transitory computer readable medium comprising computer instructions, when executed, perform a method for automatically deciding on the orientation of image, the method comprising:
   computing average and standard deviation of the top region of a portion of the image, of luminance of the bottom region of a portion of the image, of the left region of a portion of the image, and of the right region of a portion of the image;
   computing average luminance of the image;
   computing, in the digital signal processor, consolidated luminance difference and uniformity of top and bottom regions, and left and right regions, utilizing the computed average and standard deviation of at least one of the bottom region, the left region or the right region, wherein the consolidated luminance difference of top and bottom regions is $$difTB = \max(|aveT - aveImg|, |aveB - aveImg|);$$

consolidated luminance uniformity of top and bottom regions is $$stdTB = \min(stdT, stdB),$$

consolidated luminance difference and uniformity of left and right regions is $$\mathrm{dif}LR = \max(|\mathrm{ave}L - \mathrm{aveImg}|, |\mathrm{ave}R - \mathrm{aveImg}|),$$

consolidated luminance difference and uniformity of left and right regions is $$\mathrm{std}LR = \min(\mathrm{std}L, \mathrm{std}R); \text{ and}$$

utilizing portrait orientation if difLR−difTB>t1 && stdTB−stdLR>t2 or if difLR−difTB>t3 && stdTB−stdLR>t4, otherwise, utilizing landscape orientation.

* * * * *